Patented Feb. 11, 1941

2,231,562

UNITED STATES PATENT OFFICE 2,231,562

MANUFACTURE OF ALKALI-RESISTANT LAMINATED ARTICLES

John D. Carter, Lansdowne, Pa., assignor to Philadelphia Quartz Company, Philadelphia, Pa., a corporation of Pennsylvania No Drawing. Application December 21, 1937,
Serial No. 181,055

20 Claims. (Cl. 154—40)

This invention relates to manufacture of alkali-resistant laminated articles: and it relates to a process of making resistant to alkali plywood, laminated paper board and similar porous, absorbent articles in which two or more plies are united by means of an alkaline adhesive and in which the alkali of said adhesive tends to penetrate the material of the plies and to produce deleterious after-effects upon the finished articles. My process comprises impregnating at least one ply of such porous, absorbent articles with a small amount of an ammonium salt in amount sufficient to prevent or at least to substantially retard the penetration of said alkali; said ammonium salt being one which reacts with caustic alkali with the production of a neutral salt. This invention also includes the novel alkali-resistant, laminated articles produced by the said process, said articles being subject to the penetration of alkali but being at least partially impregnated with an ammonium salt of the type described in amount sufficient to substantially prevent such penetration; all as more fully hereinafter set forth and as claimed.

Corrugated paper board, combined paper board and like laminated paper products are manufactured on a large scale in this country, usually by means of continuous pasting machines, and are used for a great variety of purposes, the principal uses being in the making of paper cartons, boxes, packing cases and shipping containers. Among the requirements for such articles are strength, toughness and resistance to water. The outer facing sheets of such articles are generally made of heavily rosin-sized manila or jute paper while the inner plies are made of less expensive and less sturdy stock such as "chip" paper, strawboard, or "ground wood." The facing sheets are usually water-proofed; they are frequently printed and may be tinted in various colors in order that these articles shall present a pleasing appearance.

The laminated products which have been mentioned are usually made with the use of alkaline adhesives for uniting the plies. Sodium silicate is the adhesive most commonly employed but alkaline solutions of casein, starch and dextrin are also used. The choice of adhesive is usually based on such factors as cost, the speed of setting, the rigidity of the finished product, the water-proofness required, etc. Alkaline adhesives have one common and disadvantageous property. The alkali present in these adhesives tends to gradually penetrate the plies of any fibrous material which they unite, resulting in desizing, with a consequent loss of water-proofness, and eventually producing the fading of any dyes present, discoloration and damage to the appearance of the articles. While these deleterious results can be largely eliminated in the case of silicate of soda adhesives by suitable choice and control of the alkalinity of the adhesive used, in many special industrial applications further protection is desired. The present invention provides means for overcoming the difficulties which have been mentioned.

Many of the alkaline adhesives used in laminating processes may be readily dissolved in water even after the products containing them have been well dried. In this sense they are not completely water resistant. The present method results in the neutralization of part of the alkali carried in the adhesive, and as a result the finished bond between the plies is more resistant to water than it would be if our process had not been used. The laminated materials are less subject to separation when stored under humid or moist conditions.

In a previous patent, No. 2,015,359, I have shown how the penetration of alkali into the plies of laminated products can be prevented by impregnation of the plies with certain salts, these salts being usually of the type producing insoluble compounds upon reaction with sodium silicate. While this method has proved effective in the case of sodium silicate adhesives, it does not afford as complete protection as might be desired when other adhesives are used.

I have now found a method which is universally applicable to prevent the penetration of alkali into porous or absorbent laminated materials without exposure of these materials to the action of any acid. In this method the materials are impregnated with an ammonium salt, this salt being one which reacts with caustic alkalies with the formation of neutral salts. The chemical reaction produced results in the gradual volatilization of $NH_3$ and the formation of inert neutral salts which remain in the material without causing damage. The ammonia which is liberated in this fashion produces no deleterious effect upon any sizing materials which may be present. Neutralization of the alkali is therefore produced without the necessity of using an acid the presence of which, of course, would be frequently as objectionable as the presence of the alkali. It is thus seen that the mechanism of the action produced in the present invention is quite different from that obtained in the process of my prior acknowledged application. The ammonium salts which are used have a substantially neutral reaction as do also the salts which are eventually produced upon reaction of the ammonium salts with the caustic alkali.

I have found that, when certain ammonium salts, such as di-ammonium phosphate, for example, are used in this process, the desired results are not secured. But when ammonium di-hydrogen phosphate is used, at least some protection is obtained. This result appears to be due to the formation in some cases of alkaline-reacting salts, such as tri-sodium phosphate, which are capable themselves of producing the deleterious results sought to be eliminated. The ammonium salts employed in this process should therefore have the property of reacting with caustic alkalies with the formation of neutral salts. Examples are the chloride, acetate, sulfate, oxalate and sulfocyanide. I consider the chloride and acetate to be the best.

One convenient method of testing the efficacy of various salts in preventing the penetration of alkali into composite paper board, for example, can be conducted as follows: A piece of commercial jute paper is treated on its face side with the test solution. After drying, a piece of blue-print paper is attached to the face side by means of dextrin or other suitable neutral paste. Then another ply of jute is attached to the back of the first piece, using an alkaline adhesive. The two-ply piece is then placed in a vessel wherein an atmosphere saturated with water vapor is maintained. Any alkali penetrating to the face of the jute ply to which the blue-print paper is attached causes the formation of white areas in the blue paper. This test can be adapted readily to the testing of other materials.

The ammonium salts used in my process can be applied to the porous, absorbent materials in various ways and to various parts of the articles. The best method of application in a given case depends, of course, upon the method used in manufacturing the articles. The ammonium salt is usually applied in the form of a substantially saturated aqueous solution and this solution can be applied by spraying, dipping or brushing methods or by other methods conventionally used in the art for applying similar materials. In the making of laminated products, for example, if the manufacturing process used is a continuous one, impregnation with ammonium salts can be accomplished conveniently by the use of one or more transfer rolls of the type which are commonly employed for applying adhesive in machines for the continuous manufacture of corrugated or combined paper board. The ply or plies are contacted with a moving film of ammonium-salt solution. It is also possible to apply the ammonium salt either to the ply before it is incorporated in the composite article or to outside of the finished article by spraying or dipping methods. And the salt may be applied either on the same side of the ply to which the adhesive is to be applied or on the opposite side. Usually it is merely desired to prevent penetration of the alkali to the outside of the finished product in which case the ammonium salt may be employed in amount only sufficient to neutralize a substantial proportion of the alkali derived from the adhesive, that is, the proportion of the alkali which penetrates sufficiently to reach the outside of the finished product.

If the ammonium salt is to be applied to the back of the ply where the adhesive is to be applied, care must be taken that sufficient salt is not present to react with the adhesive thus impairing its properties. A more dilute solution of the ammonium salt can be employed in this case. It is also true that, when the ammonium salt is applied to the face of the ply, it is only necessary that it penetrate sufficiently deep to protect the appearance and waterproofness of the outer face of the sheet. Any desired concentration may be employed which produces the desired result. As the product ages, especially if it is subjected to dampness, the alkali from the adhesive tends to penetrate the plies to which it is applied more or less uniformly. The ammonium salt has less tendency to creep in this manner. For this reason an excess of the ammonium salt, in general, does less harm than an excess of alkali from the adhesive.

The following specific examples illustrate various practical ways of using the process of my invention in conjunction with the manufacture of laminated fibrous articles employing alkaline adhesives for uniting the plies, which processes are useful in making the novel articles of this invention.

*Example 1*

A jute liner was treated on its face side with a nearly saturated (30 per cent) solution of ammonium chloride. This was allowed to dry. Then a two-ply paper board was made, using this treated jute on the face side and another piece of untreated jute on the back side, the adhesive employed being a sodium silicate solution containing about 6.5 per cent of $Na_2O$ to 24.7 per cent of $SiO_2$ and having a gravity of about 33.5° Bé. This paper board was placed in a damp atmosphere. As a check, another two-ply paper board was made up employing the same adhesive and the same jute plies, both plies being untreated. This untreated board was found to be sharply bleached after exposure to this damp atmosphere over a period of 3 days, while the treated board remained unspotted for several weeks.

*Example 2*

An alkaline casein adhesive was made by softening casein in water and then adding sufficient sodium carbonate to bring the swelled grains into a smooth paste. This paste was then used as an adhesive in making two pieces of two-ply board from jute sheets. One of these boards was made with a facing sheet of jute which had been treated with a saturated solution of ammonium chloride, while the second board was made from untreated jute. After standing in a damp atmosphere for 24 hours the untreated board was found to be bleached, while the treated board remained unchanged for several days.

*Example 3*

An alkaline starch adhesive was made by mixing dry starch with water, sufficient caustic soda being added to break the starch grains and to produce a nearly clear paste. This adhesive was used in the same way to make two paper boards, one being treated and the other being untreated. Upon exposure in the same way to a damp atmosphere, it was found that the treated board remained unbleached over a substantially longer time interval than the untreated board.

The exact amount of ammonium salt required in any given commercial application cannot be specified closely, without test, for the reason that the alkalinity and solubility of the adhesive, the quantity applied, the thickness and texture of the paper, the extent to which it has been sized and the sensitiveness of any dyes used in tinting the paper, all have some bearing upon the quantity of salt required. It is usually merely sufficient to apply the ammonium salt in a quantity which is somewhat in excess of the alkali which is derived from the adhesive. As stated previously, even a substantial excess of this salt usually does no harm. It merely remains dispersed in the article as an inert filling material.

While I have outlined what I consider to be the best embodiments of my invention it is obvious, of course, that many variations can be made in the specific procedures described without departing from the purview of this invention. My process is applicable to porous, absorbent, laminated articles in general, where ever it is desired to render such articles substantially proof against the penetration or creeping of alkalies. Examples are ply-wood, laminated paper board, leather and fibrous laminated articles of all types. As stated previously, the ammonium salts may be applied to these articles in any convenient way, although usually being applied on the plies which are particularly subject to damage or which are exposed to view. Application of the ammonium salts may be made at any convenient stage. For example, the articles may remain several months in storage, if kept dry, without damage from alkali and it is therefore only necessary to apply the ammonium salts somewhat prior to the time at which they may be exposed to dampness. On the other hand it is possible to apply the ammonium salts at any time prior to contact of the articles with alkali. Owing to this wide adaptability of my process it is almost universally applicable for the purposes mentioned. Other modifications which fall within the scope of the following claims will be immediately evident to those skilled in this art.

What I claim is:

1. In the manufacture of alkali resistant plywood, laminated paper board and similar composite articles in which there is used an alkaline adhesive which tends to penetrate the plies thereby producing deleterious results, the step which comprises impregnating at least one ply of said articles with an ammonium salt of substantially neutral reaction which reacts with caustic alkalies with the formation of substantially neutral salts, in amount sufficient to neutralize at least a substantial proportion of the alkali derived from the adhesive, thereby substantially preventing penetration of said alkali in said ply.

2. The process of claim 1 wherein the facing sheets of said composite articles are impregnated with said ammonium salt.

3. The process of claim 1 wherein said ammonium salt is applied to the faces of the outer plies of said articles.

4. The process of claim 1 wherein said ammonium salt is applied to the inner sides of the outer plies of said articles, said salt being employed in quantity insufficient to impair said adhesive.

5. The process of claim 1 wherein said ammonium salt is applied to a ply of said articles by contacting said ply with a moving film of a substantially saturated solution of said salt.

6. The process of claim 1 wherein said ammonium salt is applied to a ply of said material by spraying it with a substantially saturated solution of said salt.

7. The process of claim 1 wherein the alkaline adhesive employed is a solution of sodium silicate.

8. The process of claim 1 wherein the alkaline adhesive employed is an alkaline casein solution.

9. The process of claim 1 wherein the alkaline adhesive employed is an alkaline starch solution.

10. The process of claim 1 wherein the ammonium salt employed is ammonium chloride.

11. The article of claim 13 wherein the ammonium salt is ammonium chloride.

12. The article of claim 13 wherein the ammonium salt is ammonium acetate.

13. A laminated article of porous, absorbent material having a plurality of plies united by an alkaline adhesive and being normally subject to deterioration by penetration of alkali from said adhesive but having at least one of said plies rendered substantially proof against said penetration by having incorporated therein a small amount of an ammonium salt of substantially neutral reaction which reacts with caustic alkalies with the formation of a neutral salt, said ammonium salt being present in quantity sufficient to neutralize at least a substantial proportion of the alkali derived from said adhesive.

14. The laminated article of claim 13 wherein said adhesive is a silicate of sodium.

15. The laminated article of claim 13 wherein said adhesive is alkaline casein.

16. The laminated article of claim 13 wherein said adhesive is alkaline starch.

17. A composite paper board having its plies united by a sodium silicate adhesive and being normally subject to deterioration by the penetration of alkali through the facing sheet of said board, said facing sheet being rendered substantially proof against said deterioration by having incorporated on its face side a small amount of an ammonium salt of substantially neutral reaction which forms a neutral salt upon reaction with caustic alkali, said ammonium salt being present in quantity sufficient to neutralize at least a substantial proportion of the alkali derived from said adhesive and to prevent penetration of the alkali to the face side of said sheet.

18. A laminated article of porous, absorbent material having at least two plies united by means of an alkaline adhesive which tends to penetrate said plies thereby producing deleterious results, at least one of said plies being alkali-resistant owing to the presence therein of an ammonium salt of substantially neutral reaction capable of reacting with the alkali of said adhesive with the production of a substantially neutral salt, the quantity of ammonium salt present being sufficient to neutralize at least a substantial proportion of the alkali derived from the adhesive, thereby substantially preventing the penetration of said alkali in said ply but insufficient to impair said adhesive.

19. A laminated article of porous, absorbent material having at least two plies united by means of an adhesive containing caustic alkali which tends to penetrate said plies thereby producing deleterious results, at least one of said plies being alkali-resistant owing to the presence therein of an ammonium salt of substantially neutral reaction capable of reacting with the alkali of said adhesive with the production of a substantially neutral alkali metal salt and the evolution of $NH_3$, the quantity of ammonium salt present being slightly in excess of the alkali of said adhesive.

20. In the manufacture of alkali-resistant laminated articles constructed of a plurality of plies of porous, absorbent materials, the process which comprises uniting at least two plies of such an article by means of an alkaline adhesive which tends to penetrate said plies thereby producing deleterious results and impregnating at least one of said plies with an ammonium salt having a substantially neutral reaction and capable of reacting with the alkali of said adhesive with the production of a substantially neutral salt, the quantity of said ammonium salt employed being sufficient to neutralize at least a substantial proportion of the alkali derived from the adhesive, thereby substantially preventing penetration of said alkali in said ply but insufficient to impair said adhesive.

JOHN D. CARTER.